United States Patent
Kirschey

[11] Patent Number: 5,591,083
[45] Date of Patent: Jan. 7, 1997

[54] ELASTIC SHAFT COUPLING

[75] Inventor: Gerhard Kirschey, Wuppertal, Germany

[73] Assignee: Centa-Antriebe Kirschey GmbH, Haan, Germany

[21] Appl. No.: 218,325

[22] Filed: Mar. 25, 1994

[30] Foreign Application Priority Data

Mar. 26, 1993 [DE] Germany .......................... 43 09 747.2

[51] Int. Cl.$^6$ ...................................................... F16D 3/68
[52] U.S. Cl. .............................. 464/83; 464/152; 464/903
[58] Field of Search .................................. 464/74, 76, 83, 464/150, 903, 152

[56] References Cited

U.S. PATENT DOCUMENTS

| | | | |
|---|---|---|---|
| 1,772,495 | 8/1930 | Powell | 464/83 |
| 2,326,450 | 8/1943 | Fawick | 464/76 X |
| 2,327,389 | 8/1943 | Bagnall . | |
| 2,712,742 | 7/1955 | Neidhart | 464/83 |
| 2,729,442 | 1/1956 | Neidhart | 464/83 X |
| 3,436,069 | 4/1969 | Henschen | 464/83 X |
| 3,482,464 | 12/1969 | Reich et al. | 464/83 X |
| 4,244,455 | 1/1981 | Loker | 464/83 X |
| 4,424,046 | 1/1984 | Ziegler | 464/83 X |
| 4,437,847 | 3/1984 | Calistrat | 464/83 X |
| 4,551,115 | 11/1985 | Ferguson | 464/83 |
| 4,787,878 | 11/1988 | Nikkel | 464/83 |

FOREIGN PATENT DOCUMENTS

| | | | |
|---|---|---|---|
| 0059267 | 9/1982 | European Pat. Off. | 464/903 |
| 1344257 | 10/1963 | France . | |
| 0186071 | 7/1956 | Germany | 464/83 |
| 4033596 | 2/1992 | Germany . | |
| 9304498 | 5/1993 | Germany . | |
| 0442620 | 8/1949 | Italy | 464/83 |
| 0941737 | 7/1982 | U.S.S.R. | 464/83 |
| 0801998 | 9/1958 | United Kingdom | 464/83 |
| 1021379 | 3/1966 | United Kingdom . | |
| 2239485 | 7/1991 | United Kingdom . | |

*Primary Examiner*—Daniel P. Stodola
*Assistant Examiner*—William A. Rivera
*Attorney, Agent, or Firm*—Herbert Dubno

[57] ABSTRACT

To facilitate assembly of a shaft coupling, a sleeve is provided with a polygon configuration either on the hub or in the polygonal opening of the drive side flange and is axially slidable in the matching polygon. Where the sleeve surrounds the hub, it is braced inwardly by the elastically compressible bodies between the sleeve the outer polygon. Where the sleeve fits against the outer polygon, it forms a cage retaining the elastically compressible bodies against a hub on the shaft for insertion into the opening in the flange.

8 Claims, 5 Drawing Sheets

5,591,083

ELASTIC SHAFT COUPLING

FIELD OF THE INVENTION

My present invention relates to a shaft coupling of the type in which a flange forms the drive-side element of the coupling and is connected to a source of rotary motion, a hub forms the driven-side element of the coupling and is connected to a shaft, and, between the hub and the flange and the opening in the flange in which the hub is received, which have polygonal configurations, there are provided a plurality of elastic bodies effecting torque transmission between the flange and the hub.

BACKGROUND OF THE INVENTION

Shaft couplings of the type in which extruded or bar-shaped elastic and generally elastomeric elements serve to angularly couple a flange with a hub have in the past used coupling bodies of a generally cylindrical shape which are applied with radial prestress between the outer periphery of the hub and the inner periphery of the flange, i.e. the opening in the flange in which the hub is received.

Generally in such cases the inner periphery of the opening in the flange is a regular four-sided polygon (square) with the outer periphery of the hub forming a geometrically similar polygon which, however, is of smaller diameter (diagonal dimension). An angular offset between the hub and the polygon formed by the opening in the flange, usually to maintain symmetry an angular offset of 45° in the case of four-sided polygons, results in pockets between the vertices of the outer polygon and the sides of the inner polygon.

The elastomeric coupling bodies are received in these pockets and are compressed between the surfaces of the hub and the surfaces adjacent the hub vertices of the corners of the outer polygon with a distortion depending upon the relative angular displacements of the hub and the coupling flange. These coupling bodies then act as torsion springs.

The relatively soft transmission of torque between the coupling flange and the hub through the elastomeric bodies has made the prospects for such coupling very promising, although in practice such couplings have not played a significant role in the marketplace, especially because of the difficulty in assembling the coupling with a shaft in the axial direction.

The hub can have a previously formed bore with a groove for the key which is to angularly connect the shaft with the hub. In the past it has been necessary to assembly the hub onto the shaft by hammering and this poses a problem since exact axial alignment of the flange usually requires that it be premounted on the driving member in exact axial alignment therewith before the shaft is hammered in place. The problems associated with this type of mounting have largely precluded use of the coupling.

Furthermore dismounting of the coupling has required special pullers to separate the shaft from the remainder of the coupling.

OBJECTS OF THE INVENTION

It is, therefore, the principal object of the present invention to provide a shaft coupling of the type described which permits mounting and dismounting or assembly and disassembly in an especially simple manner.

Another object of this invention is to provide a shaft coupling which avoids the drawbacks of the prior art shaft couplings of the type described.

SUMMARY OF THE INVENTION

These objects and others which will become apparent hereinafter are attained, in accordance with the invention by providing in a shaft coupling of the type described an outer sleeve lining and conforming to the hub or an inner sleeve lining and conforming to the coupling flange opening which serves to brace the elastomeric coupling bodies internally or externally, respectively, and forming a rotationally fast (angular) coupling with the shaft or the coupling flange opening, respectively, while being axially slidable relative thereto and fully complementary to the hub and the coupling flange opening, respectively.

More particularly, the shaft coupling can comprise:

- a drive-side flange member adapted to be connected to a drive, the flange member being formed with a central opening of a configuration of a first polygon centered on an axis of rotation of the flange member;
- a driven-side hub member provided with an external configuration of another polygon geometrically similar to and smaller than the first polygon, the other polygon being angularly offset from the first polygon whereby pockets are formed between polygon faces of the other polygon and vertices of the first polygon, the hub member being connectable to a shaft to be driven by rotation of the flange member;
- a respective elastic coupling body received in each of the pockets for angularly coupling the hub member with the flange member for driving of the shaft upon rotation of the flange member; and
- a sleeve lining one of the members and defining the respective polygon and angularly coupled with the respective member but axially slidable relative thereto facilitating assembly of the hub member into the flange member.

As noted, that sleeve can line and conform to the hub to slidably receive the hub upon assembly of the hub into the flange or can line the opening and be insertable into the opening with the hub and the coupling bodies.

As a consequence, the coupling flange can be premounted on its drive and the sleeve serves to brace the elastomeric coupling bodies, whether they are provided beforehand on the flange or on the hub, thereby enabling even difficult rotary prestresses to be readily achieved. It should be noted that the higher the rotary prestress of the elastomeric bodies, the greater will be the load capacity of the elastic shaft coupling in terms of the torque which can be transmitted.

The coupling can thus be simply assembled with the shaft in that the hub can be provided on the shaft before it is inserted into the flange opening with any appropriate keying. In this case, the hub serves as an adapter of the shaft to the coupling and need not be previously integrated into the portion of the coupling formed on the flange.

The sleeve can be composed of a synthetic resin, especially a polyamide (e.g. nylon) which can be self-lubricating and thus can have excellent sliding characteristics. A metal-to-metal contact can thus be avoided.

Advantageously the hub, the sleeve or both are composed of drawn, seamless material which eliminates the need for additional machining.

The coupling flange itself can be composed of a synthetic resin which is preferably fiber-reinforced and in that case its inner sleeve can be preferably constituted of metal. The fiber-reinforced plastic can be glass fiber or carbon fiber-reinforced epoxy resin depending upon the load requirements for the coupling.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
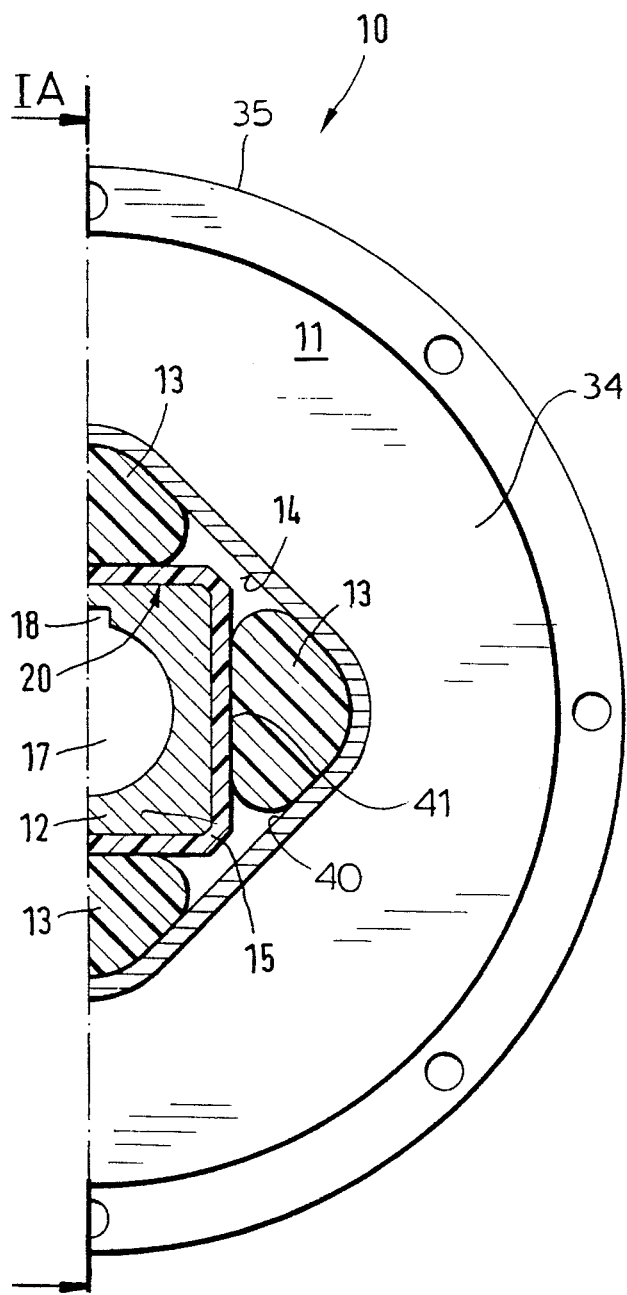
FIG. 1 is an end view partly broken away of a shaft coupling in accordance with the invention.

The shaft coupling 10 (FIGS. 1, 1A and 1B) comprises a coupling flange 11, a hub 12 and a plurality of elastomeric coupling bodies 13 which, in their expanded and noncompressed state may be circularly cylindrical bars which can be cut from an extruded strand.

In all of the embodiments described the elastomeric bodies 13 will be found to be under radial precompression between the outer surface of a hub 12 and the inner surface of a coupling flange opening 14. In the embodiments of the invention, however, these coupling bodies are not disposed directly between the hub and the flange, but rather are braced against an inner or an outer sleeve between the bodies and the hub or between the bodies and the wall of the opening, respectively, as the case may be.

Figure 1A:
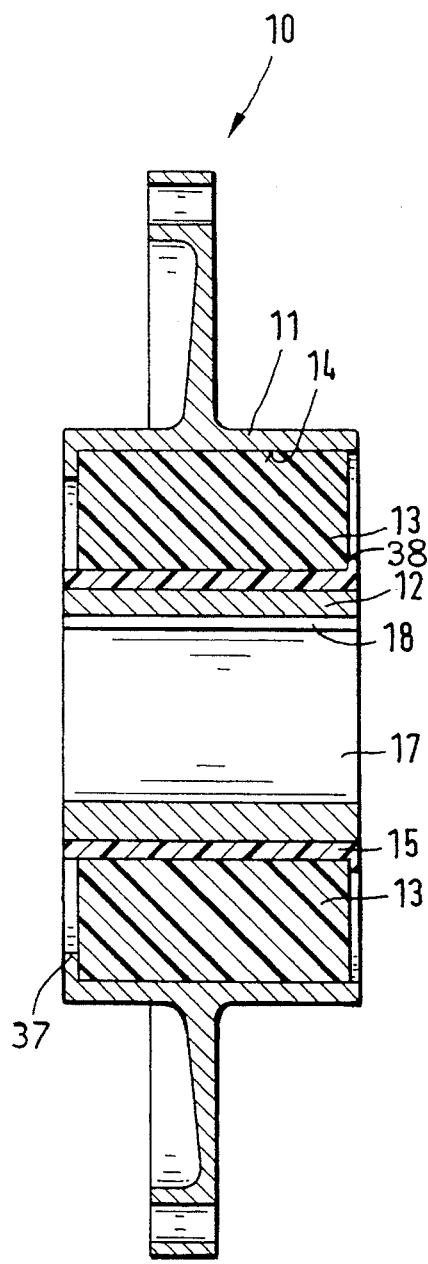
FIG. 1A is a cross sectional view taken along the line IA—IA of FIG. 1.
Figure 1C:
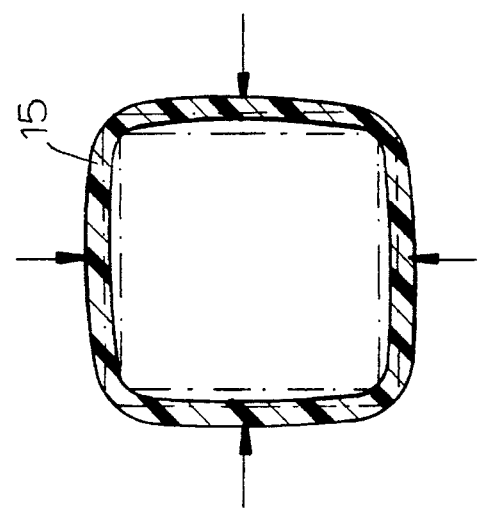
FIG. 1C is a transverse section through the sleeve of FIGS. 1, 1A and 1B prior to flattening of the sides thereof by the radially prestressed coupling bodies.
Figure 1B:
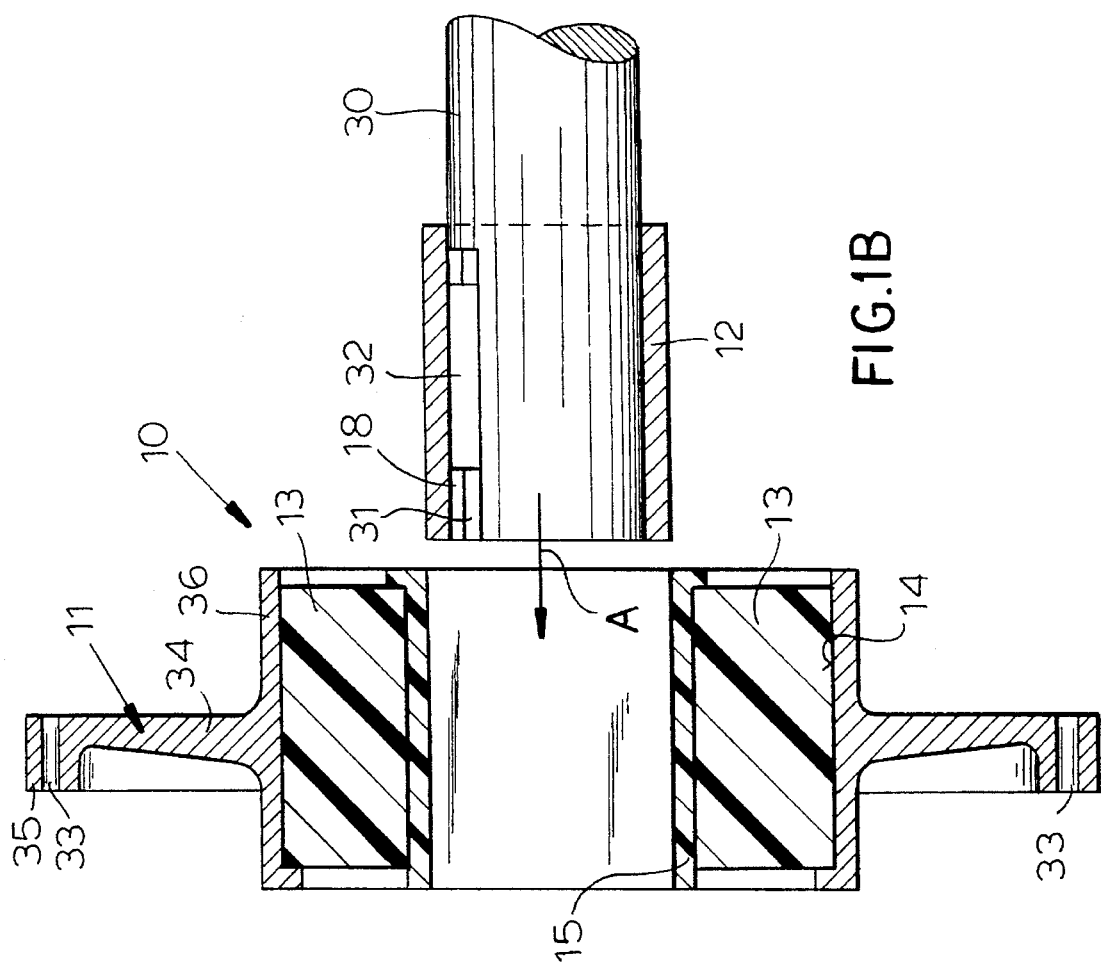
FIG. 1B is an exploded cross sectional view showing the assembly of a shaft coupling in accordance with the invention.

The sleeve 15 in the embodiment of FIGS. 1, 1A and 1B, matches in shape the outer periphery of the hub 12 and externally lines the latter and has a geometrically similar outer periphery.

It is important that between the hub 12 and the sleeve 15 there is no play in the angular coupling between the two, but there is axial slidability in spite of the close fit.

The hub 12 has an inner bore 17 adapted to receive a shaft, e.g. the shaft 30 seen in FIG. 1B, and a key groove 18 which can align with the key groove 31 of the shaft so that a key 32 can rotationally couple the hub 12 with the shaft 30.

For assembly of the coupling, the hub and the shaft 30 can simply be inserted into the sleeve in the direction represented by the arrow A in FIG. 1B. The flange 11 can be formed with bores 33 along its periphery to allow the flange to be previously attached to a drive.

The web 34 of the flange can connect the rim 35 with a sleeve-like portion 36 formed with the opening 14. The thickened rim 35 is provided with the bores 33.

The sleeve-like portion 36 can be formed with an inwardly extending shoulder 37 which forms an axial stop for the compressible bodies 13. Another axial stop is formed by the outwardly turned shoulder 38 of the sleeve 15.

Figure 2:
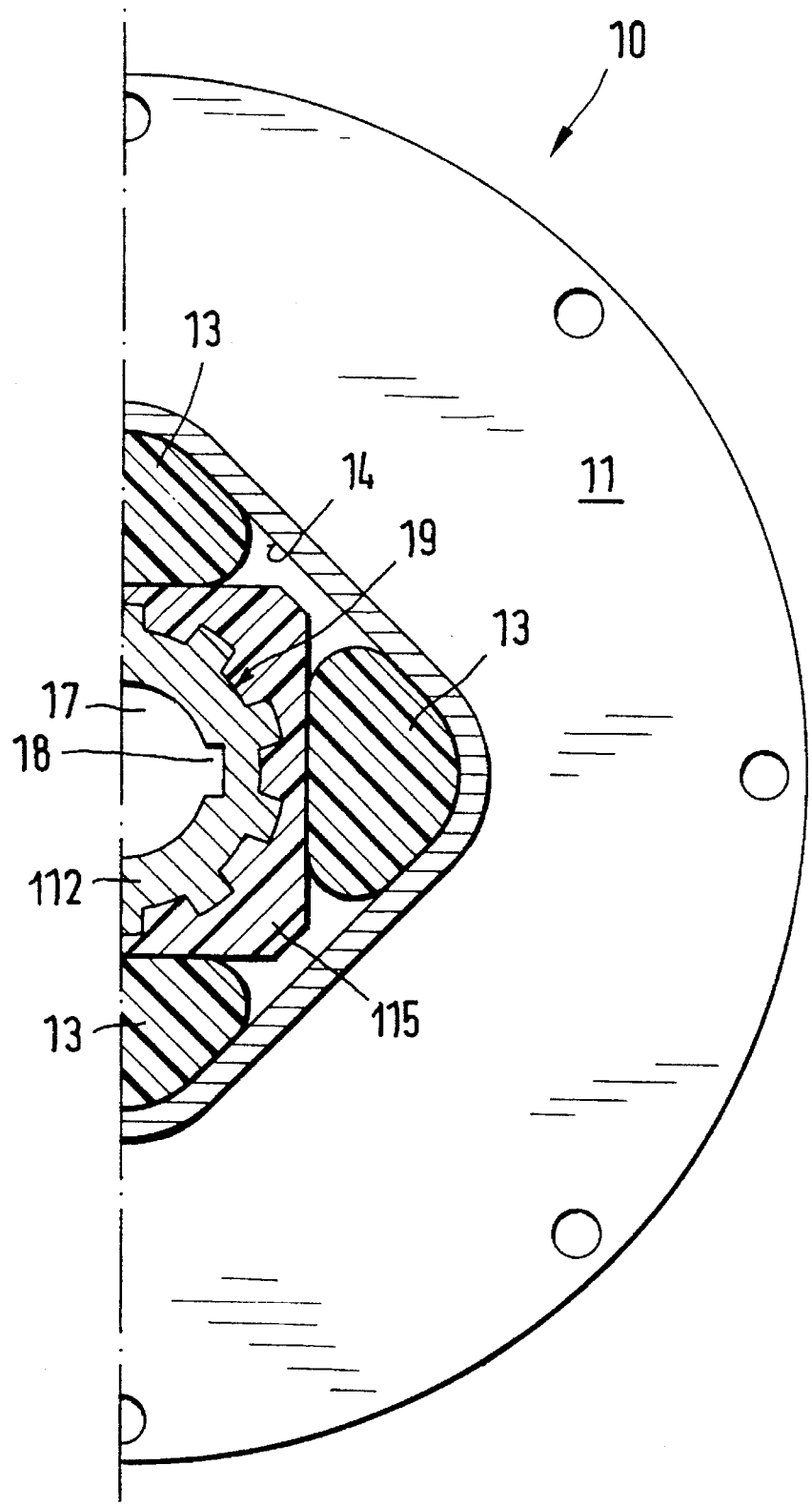
FIG. 2 is a view similar to FIG. 1 illustrating another embodiment.

The same principle applies to the coupling illustrated in FIG. 2, but here the hub 112 provided with the bore 17 and the key slot 218, has a splined outer periphery 19 rather than the configuration of a four-sided polygon. The splined configuration 19 is complementarily received in the axially slidable sleeve 115 formed with the polygonal outer periphery. Other kinds of keying between the hub 12, 112 and the sleeve 15, 115 can also be provided as long as the periphery of the hub and the internal passage of the sleeve and noncircular. For example, the outer periphery of the hub and the inner configuration of the sleeve can correspond to involute configurations. The outer periphery of the hub 12, 112 can be drawn so that additional machining after drawing is not required.

In both of the embodiments described, the sleeve 15 or 115 can be composed of a synthetic resin or plastic, especially when the hub 12 or 112 is composed of steel. This avoids metal to metal contact and ensures the closest possible fit between the hub and sleeve while permitting the axial shifting of the hub relative to the sleeve.

To prevent the sleeve from being bulged inwardly by the elastomeric bodies 13 when the latter are received under precompression in the pockets 40 between the vertices of the polygonal opening 14 and the surfaces 41 of the sleeve 15 (FIG. 1), the walls of the sleeve 15 can be made, as shown (in FIG. 1C) with outward bulges so that they are flattened by the rotary force applied by bodies 13 to, for example, the dot-dash positions shown in FIG. 1C.

Figure 3:
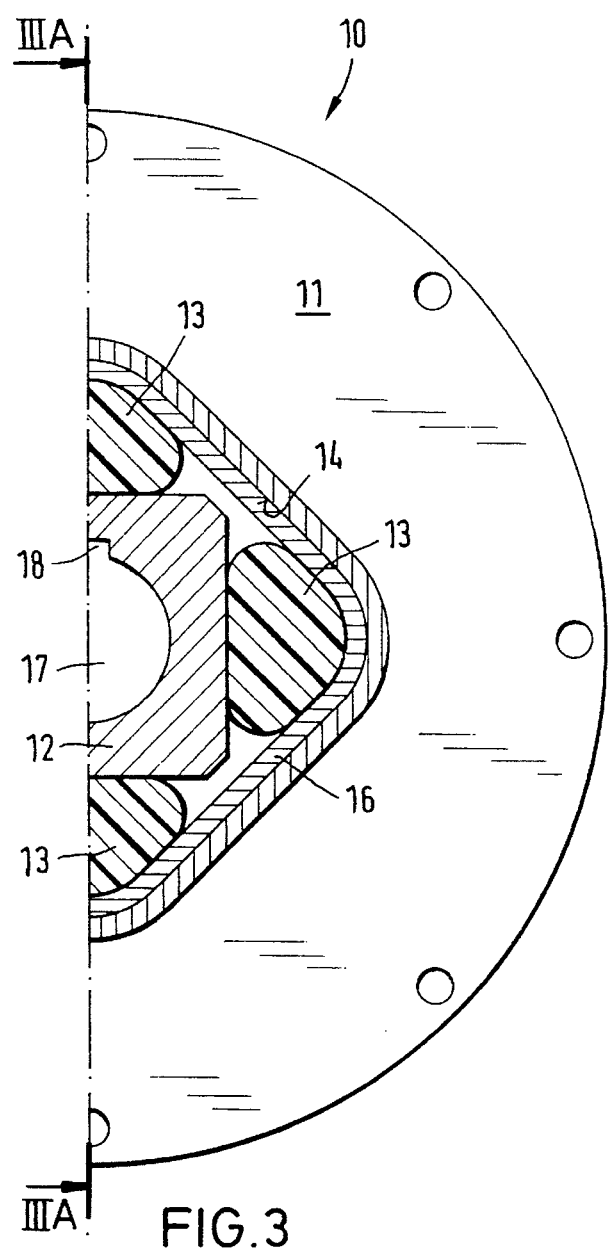
FIG. 3 is another view similar to FIG. 1 showing an embodiment in which the sleeve lines the opening in the flange.
Figure 3A:
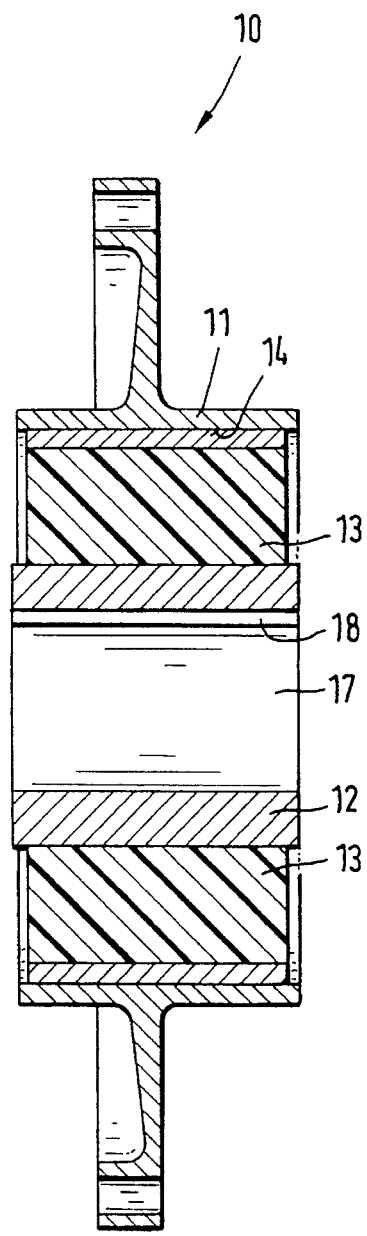
FIG. 3A is a cross sectional view taken along the line IIIA—IIIA of FIG. 3.
Figure 3B:
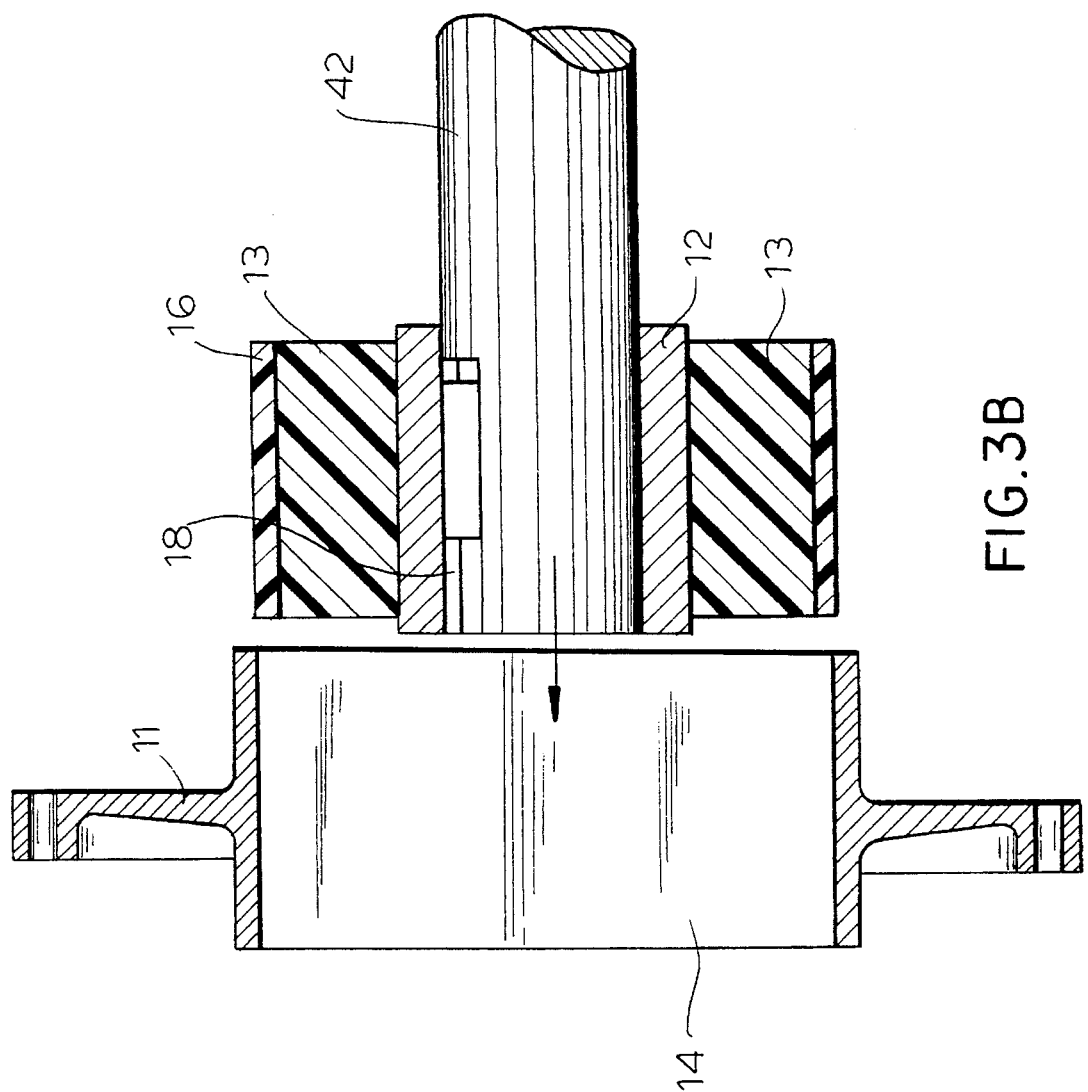
FIG. 3B is a view illustrating the assembly of the coupling of FIGS. 3 and 3A.

In the embodiment of FIGS. 3, 3A and 3B, a sleeve 16 is axially slidable in close fitting relationship with walls of the opening 14 formed in the flange 11. In this case, as can be seen from FIG. 3B, the hub 12 is premounted with the compressed bodies 13 and the sleeve 16 on the shaft 42 and this assembly is inserted into the opening 14 for mounting of the coupling. Disassembly is also effected simply by pulling the sleeve 16 with the bodies 12 and hub 13 premounted therein, from the flange 11 and its opening 14.

In the embodiment of FIGS. 3, 3A and 3B, the sleeve 16 forms a kind of cage for the elastomeric bodies 13 which do not bear directly against the wall of recess 14 but rather are captured in the sleeve 16 for insertion therewith into the flange.

The opening 14 and the hub 2 in FIG. 12 in FIG. 3 and the hub 12 of FIG. 1 or the hub assembly 112, 115 in FIG. 2 have polygonal peripheries with the identical number of sides of the polygon and thus are geometrically similar.

The hub polygon is angularly offset from the opening polygon to define the pockets mentioned above between the polygon sides 20 of the hub assemblies and the vertices of the opening 14 or the sleeve 16. The polygon sides 20 need not be flat but can, for example, be concave toward the elastomeric bodies. The offset between the hub and the sleeve need not be symmetrical or shown, but should be sufficient to provide the pockets allowing the elastomeric bodies to be trapped therein without being extruded past the corners of the hub upon relative rotation. The flange 11 is preferably composed of glass fiber-reinforced synthetic resin, e.g. epoxy, and the inner sleeve 16 of metal or plastic.

I claim:

1. A shaft coupling, comprising:

a drive-side flange member formed with an annular plate provided with peripheral holes adapted to be bolted to a drive, said plate being formed with a tubular element projecting axially on opposite sides of said plate and defining a central opening of a configuration of a first polygon centered on an axis of rotation of the flange member, said plate forming a flange in one piece with said tubular element midway of the length thereof and between ends of the tubular element;

a driven-side hub member of the same axial length as said tubular element provided with an external configuration of another polygon geometrically similar to and smaller than said first polygon, said hub member being disposed in said tubular element, said other polygon being angularly offset from said first polygon whereby pockets are formed between polygon faces of said other polygon and vertices of said first polygon, said hub member having a keyway connectable to a shaft to be driven by rotation of said flange member;

a respective elastic coupling body received in each of said pockets for angularly coupling said hub member with said flange member for driving of said shaft upon rotation of said flange member; and a sleeve composed of plastic lining said hub member complementary to the hub member and defining the other polygon and angularly coupled with the hub member but axially slidable relative thereto facilitating assembly of said hub member into said flange member, said sleeve having an outwardly turned shoulder lying in a plane perpendicular to said axis and said tubular element having an inwardly turned shoulder lying in a plane perpendicular to said axis, said shoulders engaging opposite ends of said coupling bodies.

2. The shaft coupling defined in claim 1 wherein said sleeve lining said hub member and slidably receiving said hub member upon assembly of said hub member into said flange member.

3. The shaft coupling defined in claim 1 wherein said sleeve is composed of a plastic.

4. The shaft coupling defined in claim 3 wherein said plastic is a polyamide.

5. The shaft coupling defined in claim 1 wherein said hub member is composed of drawn seamless material.

6. The shaft coupling defined in claim 1 wherein said sleeve is composed of drawn seamless material.

7. The shaft coupling defined in claim 1 wherein said sleeve and said hub member are composed of drawn seamless material.

8. The shaft coupling defined in claim 1 wherein said sleeve lines said hub member and is preformed with outwardly bulging walls flattened upon insertion of said coupling bodies in said pockets.

* * * * *